United States Patent Office 3,263,522
Patented August 2, 1966

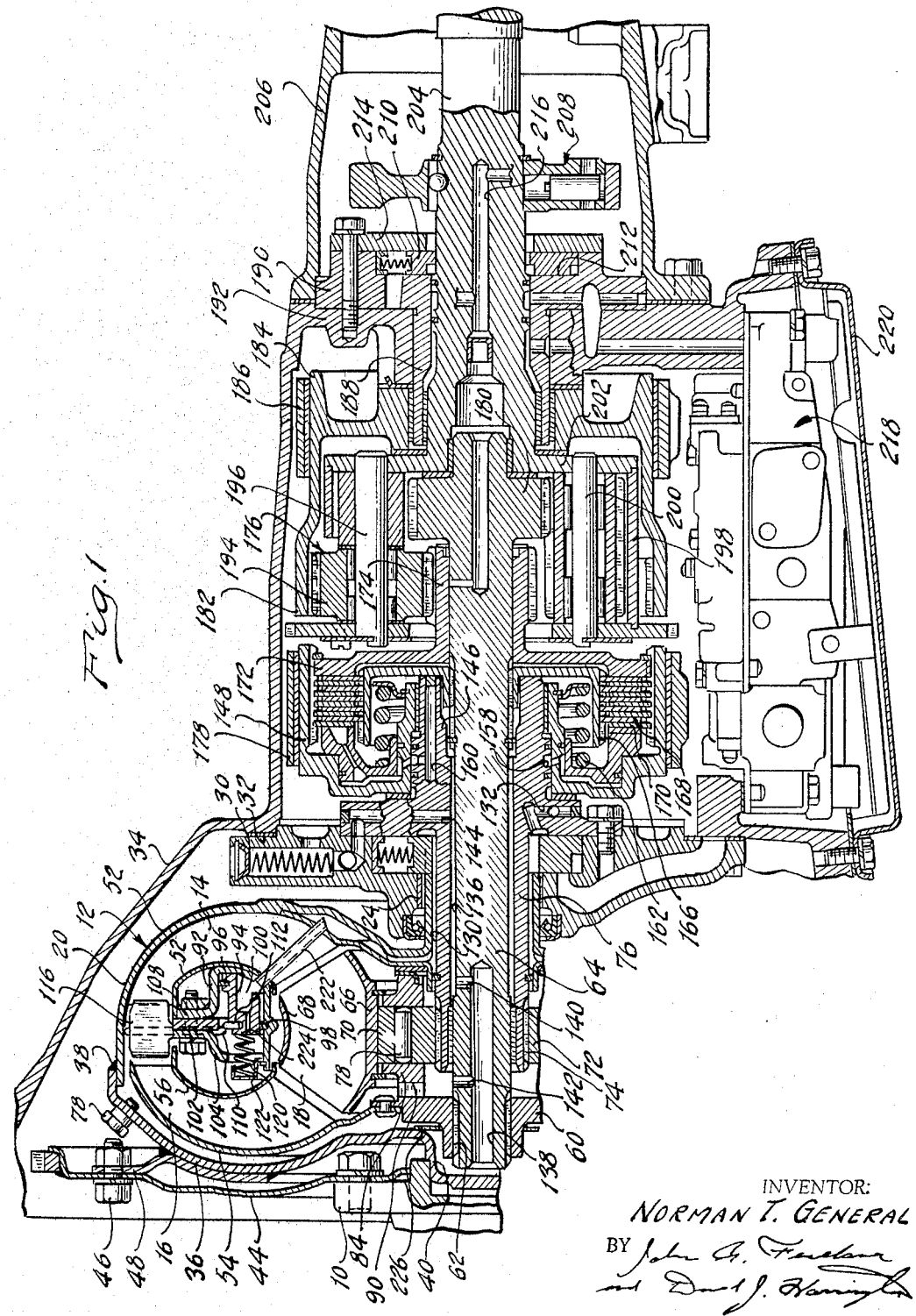

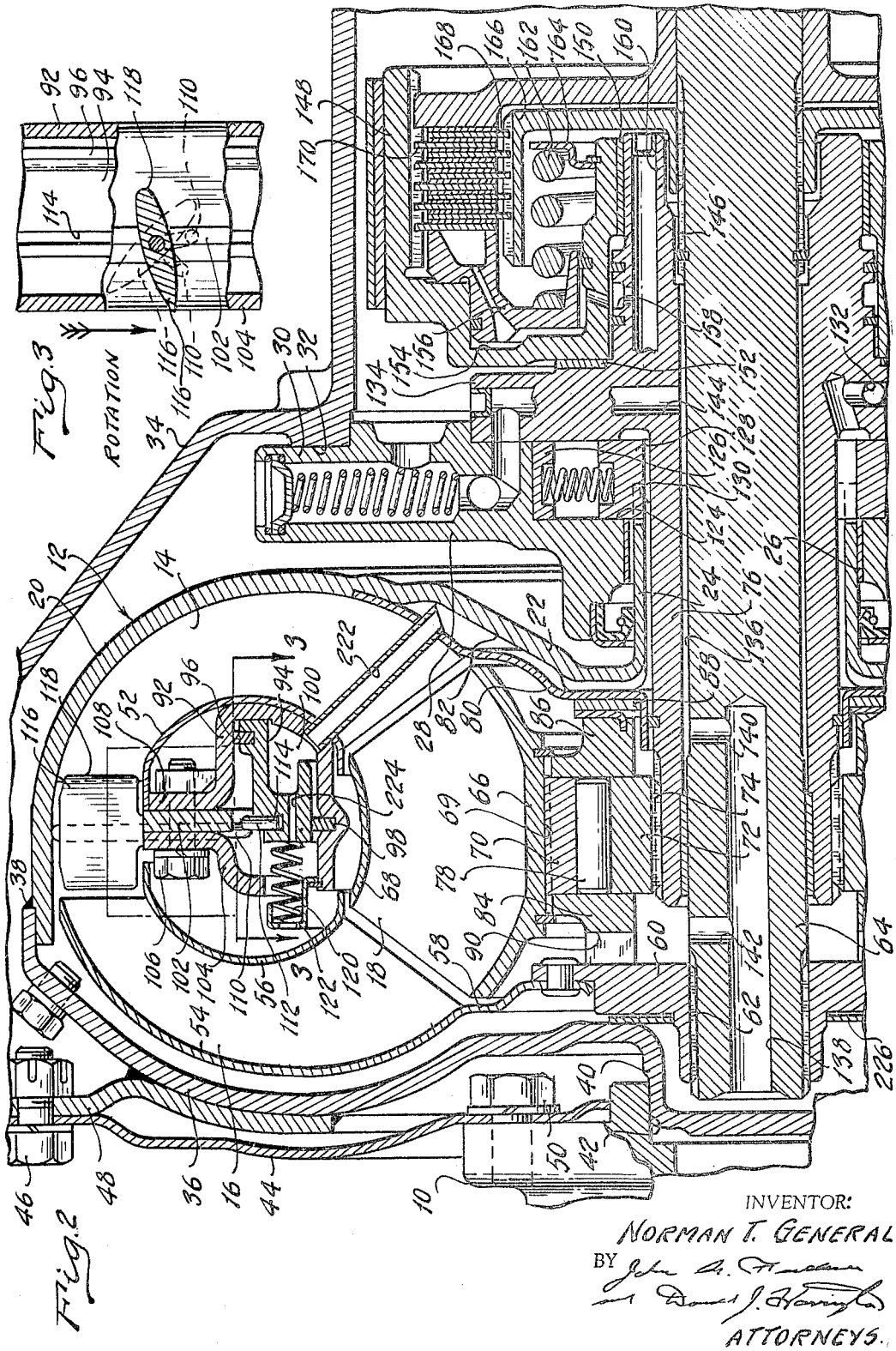

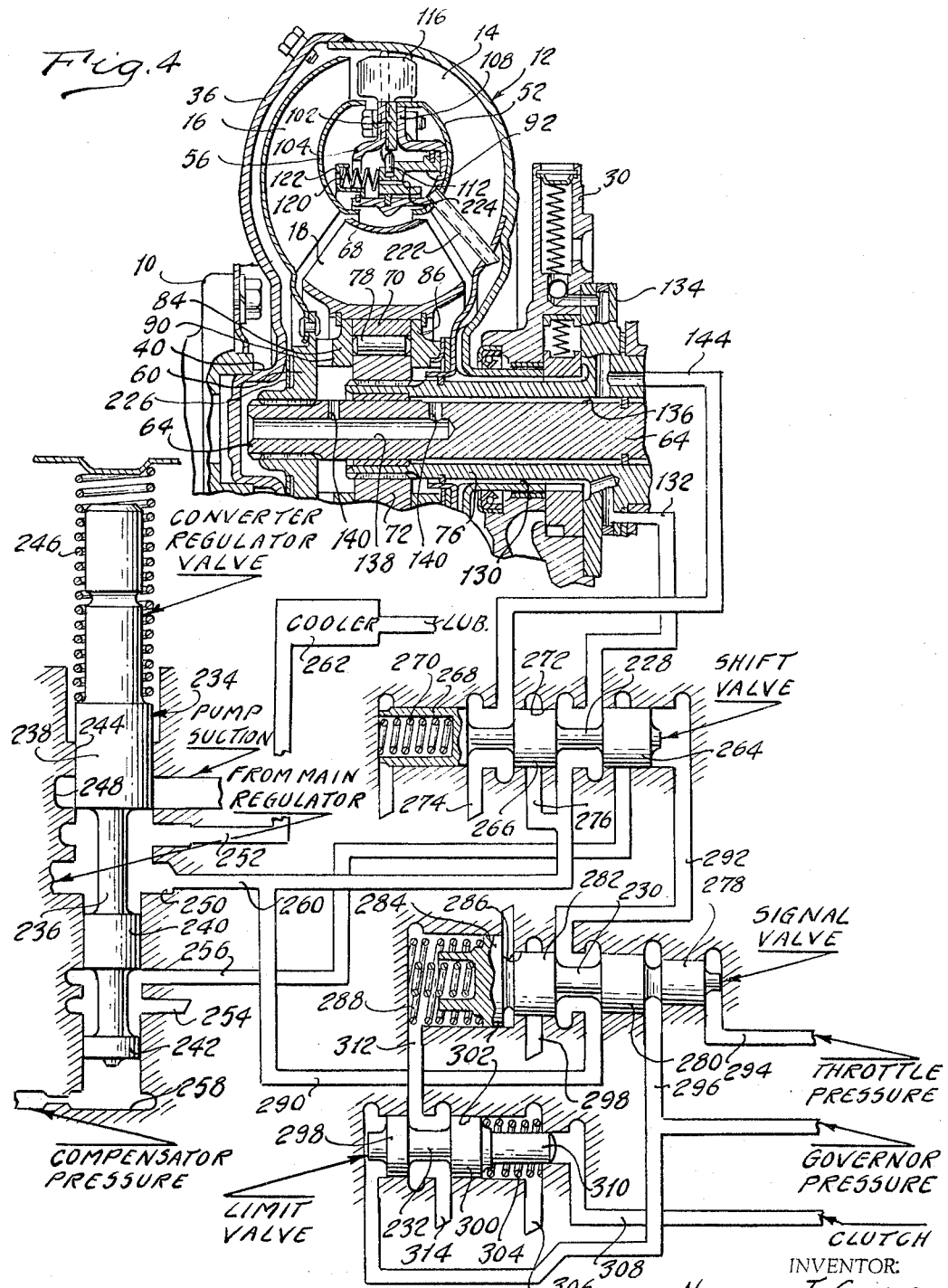

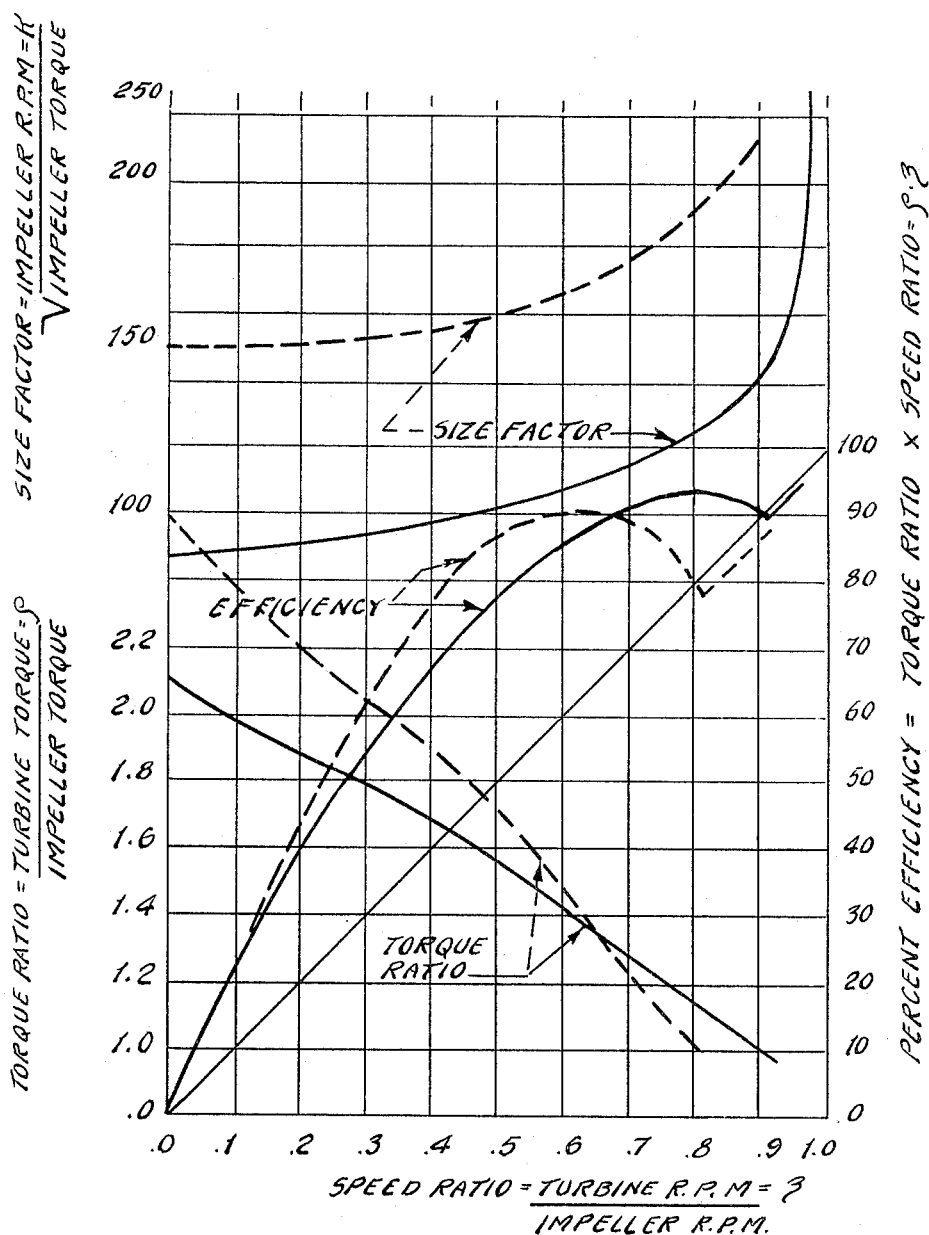

3,263,522
DUAL RANGE TORQUE CONVERTER TRANSMISSION
Norman T. General, Orchard Lake, Mich., assignor to Ford Motor Company, Dearborn, Mich., a corporation of Delaware
Filed Oct. 2, 1963, Ser. No. 313,230
8 Claims. (Cl. 74—645)

My invention relates generally to hydrokinetic power transmission mechanisms, and more particularly to improvements in a hydrokinetic torque converter having a dual range impeller wherein provision is made for altering the hydrokinetic characteristics of the converter to condition it for either maximum torque ratio performance or maximum efficiency, lower torque ratio operation.

The impeller of the torque converter of my improved mechanism comprises a first bladed section having blades that are relatively fixed with respect to a rotary impeller shell. The shell in turn may be connected drivably to a vehicle engine in an automotive vehicle driveline. An adjustable blade section is carried by the impeller shell at the flow exit region of the fixed impeller blades and the angularity of the blades thereof can be changed to condition the torque converter for operation in either of two performance ranges.

A bladed turbine is disposed in toroidal fluid flow relationship with respect to the impeller with the flow entrance region thereof located adjacent the adjustable section of the impeller. A bladed stator is situated in the usual fashion between the flow exit region of the turbine and the flow entrance region of the impeller.

A multiple speed ratio gear system can be connected drivably to the torque converter unit, a power input element of the gear system being powered by a turbine driven shaft. Clutch and brake structure is employed for controlling the relative motion of the elements of the gear system to condition the mechanism for operation in any one of the multiple speed ratios that are available.

The invention of this disclosure is an improvement in the structure disclosed in co-pending application Serial No. 167,071 now abandoned, filed in the name of Martin G. Gabriel. This co-pending application is assigned to the assignee of my instant invention.

Like the disclosure of the co-pending application, the adjustable blade elements of the impeller are controlled by means of a fluid pressure operated servo that is carried by an inner shroud that forms a part of the impeller assembly. The servo includes an annular piston and a cooperating annular cylinder situated within the inner torus region of the converter unit.

It is necessary in a torque converter mechanism of this type to provide a continuous flow of fluid through the converter unit in order to maintain the temperature of the hydrokinetic fluid at a stabilized value during operation. According to a principal feature of my invention, I have provided a flow circuit for maintaining this continuous circulation. This circuit includes a flow restricting orifice that establishes a pressure differential across the impeller blade adjusting servo piston. Thus the piston will respond to the pressure differential created by the hydrokinetic fluid flow to adjust the bladed exit section of the impeller to the desired operation position.

Adjustment of the piston to another operating position merely requires a reversal in the direction of the flow of the hydrokinetic fluid passing through the flow restricting orifice so that the pressure differential acting upon the piston will be reversed. Thus the bladed section of the impeller can be controlled so that it will assume either a high performance position when the fluid flow passes in one direction through the orifice or a high efficiency cruising position when the hydrokinetic fluid flow is reversed.

It is a principal object of my invention, therefore, to provide a torque converter mechanism of this type wherein the effective impeller blade geometry can be altered in response to changes in the direction of the fluid passing through the converter unit.

It is a further object of my invention to provide a valve system that is capable of controlling automatically the direction of flow through the hydrokinetic unit in response to operating variables such as the driver demand for engine torque and the driven speed of the power output member of the transmission mechanism.

It is a further object of my invention to provide a valve system of the type above set forth wherein provision is made for inhibiting the action of flow controlling elements of the valve system when the driven speed of the power output member is greater than a precalibrated value.

It is another object of my invention to make provision for increasing the speed at which the previously mentioned inhibiting action takes place as the gear system is conditioned for high speed ratio operation.

For the purpose of describing more particularly the improvements of my invention, reference will be made to the accompanying drawings wherein:

FIGURE 1 shows in cross-sectional form a power transmission mechanism having a torque converter that embodies the improvements of my invention;

FIGURE 2 shows an enlarged view of the torque converter portion of the structure of FIGURE 1;

FIGURE 3 is a cross-sectional view taken along the plane of section line 3—3 of FIGURE 2;

FIGURE 4 is a schematic diagram of a control valve system that is adapted to control the direction of flow of fluid through the converter mechanism of FIGURES 1 and 2; and FIGURE 5 is a performance chart showing the characteristics of the torque converter unit of FIGURES 1 and 2.

Referring first to FIGURE 1, numeral 10 designates a portion of a crankshaft for an internal combustion vehicle engine in an automotive vehicle driveline. Numeral 12 designates generally a hydrokinetic torque converter unit which includes an impeller 14, a bladed turbine 16 and a bladed stator 18. The impeller 14 includes an impeller shell 20 which is formed with a generally toroidal shape. The hub 22 of shell 20 forms a sleeve 24 that is journalled by means of a bushing 26 within an aperture formed in a supporting wall 28. This wall is secured at its periphery 30 to a shoulder 32 formed on the interior of a transmission housing 34.

Shell 20 is connected to an auxiliary shell part 36 and is secured thereto at its periphery by means of weld metal 38. Shell part 36 extends radially inwardly and cooperates with shell 20 to define a closed cavity. It is formed with a hub 40 that is received within a pilot opening 42 formed in the end of crankshaft 10.

A drive plate 44 is secured at its periphery by means of bolts 46 to brackets 48 which are welded to the outer surface of the shell part 36. The inner periphery of drive plate 44 is secured by bolts 50 to a flanged portion of the crankshaft 10.

The impeller 14 includes an inner shroud 52 which cooperates with the interior surface of the shell 20 to define radial outflow passages. Impeller blades are located in these passages and are fixed to the shroud 52 at the interior of the shell 20 in known fashion.

The turbine 16 includes an outer turbine shroud 54 and an inner turbine shroud 56. These shrouds define radial inflow passages within which are received turbine blades that are secured in known fashion to the shrouds 54 and 56.

The hub 58 of shroud 54 is riveted or otherwise secured to the turbine hub 60. This hub is splined at 62 to a turbine shaft 64 which extends coaxially with respect to the converter unit.

Situated between the flow exit region of the turbine 16 and the flow entrance region of the impeller 14 are stator blades carried by a first stator shroud 66 and a second stator shroud 68. Shroud 66 is formed with a central opening 69 which is internally splined to receive an externally splined overrunning brake race 70. A cooperating overrunning brake inner race 72 is splined at 74 to a relatively stationary stator shaft 76. Overrunning brake elements 78 are located between the races 70 and 72 and cooperate with cam surfaces formed on one of the races to provide a clutching action therebetween. The rollers 78 prevents rotation of the stator 18 in a direction opposite to the direction of rotation of the impeller but permit freewheeling motion thereof in the same direction as the impeller rotation during coupling operation of the converter unit.

A flow directing adaptor 80 is secured to the inner surface of the shell 20 adjacent hub 22. It is spaced from the hub 22 to define a radial flow passage 82. Thrust elements 84 and 86 are situated on either side of the races 70 and 72 between the hub 60 and the adaptor 80. If desired a thrust washer can be situated between element 86 and the hub 22.

Element 84 is formed with radial grooves or slots 90 which form a part of the flow circuit for the hydrokinetic fluid as will be explained subsequently.

An annular cylinder 92 is secured to shroud 52 and is located in the inner torus region of the fluid flow circuit of the converter unit. Situated within the annular cylinder 92 is an annular piston 94. Suitable sealing rings 96 and 98 are carried by the piston 94 and the cylinder 92 respectively. Cylinder 92 and piston 94 cooperate to define a pressure cavity 100.

An annular spacer 102 and a stop member 104 are secured by means of bolts 106 to a flanged portion 108 of the cylinder 92. Stop member 104 and spacer 102 are recessed to define openings that receive radial shafts 110. Each shaft 110 is formed with an offset portion as indicated by 112. These offset portions are received within an annular groove 114 formed in the piston 94.

The radially outward end of each shaft 110 carries an adjustable blade element 116. The leading edge 118 of each blade element 116 is located between two adjacent trailing edges of the radial outflow blades of the impeller 14. Thus as the piston 94 is adjusted axially as viewed in FIGURES 1 and 2, the angularity of the blade elements 116 can be changed. Two operating positions of the blade elements 116 are illustrated at FIGURE 3. The full line position shown in FIGURE 3 represents the cruising position if it is assumed that the direction of rotation of the impeller is in the direction of the arrow shown on FIGURE 3. The dotted line position of the blade element 116, however, represents the high performance position.

Piston 94 may be urged normally in a right hand direction, as viewed in FIGURES 1 and 2, by means of a piston return spring 120 which is located between the piston 94 and a spring seat in the form of a snap ring 122 carried by the inner margin of the cylinder 92.

Supporting wall 28 defines a pump cavity 124 within which are received positive displacement pumping elements 126 and 128. These elements define a pump that is used both as a fluid pressure source for an automatic control system shown in part in FIGURE 4 and as a source of fluid pressure for supplying the converter torus cavity with fluid. The pumping element 128 can be keyed to the extension 24 of the impeller hub 22 so that the pump will be driven by the vehicle engine.

The extension 24 surrounds stationary stator sleeve shaft 76 as indicated to define an annular flow passage 130 which communicates with the passage 82. It communicates also with a fluid feed passage 132 formed in an adaptor 134 to which the sleeve shaft 76 is connected. Adaptor 134 in turn is secured to the wall 28.

The turbine shaft 64 is journalled within the sleeve shaft 76 by means of a bushing. The sleeve shaft 76 cooperates with the turbine shaft 64 to define an annular flow passage 136 which communicates with a central passage 138 through a radial branch passage 140. Passage 138 in turn extends to the left-hand end of shaft 64 and communicates with the interior of the hub 40. A second radial branch passage 142 also can be provided to establish communication between passage 138 and the space between the overrunning brake races and the turbine hub 60. Fluid communication between passage 142 and the interior of the torus flow circuit is provided by the previously described radial grooves or slots 90 formed in the spacer element 84.

Passage 136 communicates with a fluid delivery passage 144 formed in the adaptor 134. Adaptor 134 is formed with a sleeve shaft extension 146 upon which is journalled rotatably a brake drum 148, a suitable bushing 150 being provided for this purpose. A thrust washer 152 is situated between the drum 148 and the adaptor 134.

An annular cylinder 154 is defined by the drum 148. Slidably positioned within the cylinder 154 is an annular piston 156. The cylinder 154 and the piston 156 cooperate to define a fluid pressure chamber that is in fluid communication with an annular groove 158. This groove in turn communicates with a clutch pressure feed passage 160.

The passages 132, 144 and 160 form a part of an automatic control valve system that will be described with reference to FIGURE 4.

Piston 156 normally is urged in a left-hand direction by piston return spring 162 situated between the piston 156 and a spring seat 164 carried by the hub portion of the drum 148.

Splined to shaft 64 is an externally splined clutch member 166 which carries internally splined clutch discs 168. These discs are situated in interdigital relationship with respect to externally splined clutch discs 170 carried by an internally splined portion of the drum 148.

A clutch disc back-up member 172 also is splined to the drum 148 and serves as a reaction member for the pressure force applied to the piston. Member 172 is drivably connected to a sun gear 174 of a compound planetary gear unit 176. A low speed reaction brake 178 surrounds the drum 148 and may be applied and released selectively by means of a suitable fluid pressure operated brake servo in known fashion.

The planetary gear unit 176 includes also a relatively large pitch diameter sun gear 180 which is connected to shaft 64. It includes also a ring gear 182 which forms a part of brake drum 184. A reverse brake band 186 surrounds drum 184 and may be applied and released selectively by means of a suitable fluid pressure operated brake servo in known fashion. Drum 184 is journalled rotatably upon a stationary sleeve shaft extension 188 which forms a part of an end wall 190. This wall in turn is secured to a wall 192 which forms a part of the transmission housing 34.

The planetary gear unit 176 includes also a first set of planet pinions 194 which are journalled upon a pinion shaft 196. These pinions 194 engage drivably a second set of pinions 198 which in turn drivably engage sun gear 180. Pinions 194 drivably engage sun gear 174 as well as the ring gear 182.

Pinions 198 are rotatably journalled upon a pinion shaft 200. Shafts 196 and 200 are carried by a common carrier 202 that is connected directly to a power output shaft 204. This shaft is journalled within the sleeve shaft extension 188. A transmission tail shaft extension housing 206 is bolted or otherwise secured to the wall 192 and encloses the shaft 204. A suitable fluid pressure governor valve mechanism 208 is drivably carried by shaft 204 and functions to supply a fluid pressure speed signal that is utilized by the automatic control valve system. A power output shaft driven rear pump 210 is situated within a pump cavity 212 formed in the end wall 190. The pump cavity 212 is defined also by a closure plate 214. Fluid pressure from the pump 210 is supplied to the governor valve assembly 208 through the feed passage 216 formed in the shaft 204.

The automatic control valve system is located within a transmission sump. It has been indicated generally by reference character 218. The sump is defined in part by an oil pan 220 secured to the lower portion of the transmission housing 34. Both the front pump and the rear pump communicate with a low pressure region of the valve assembly 218.

The gear system of FIGURE 1 is capable of establishing two forward driving speed ratios and a single reverse speed ratio. To establish a low speed forward drive ratio, brake band 178 is applied. Turbine torque developed by the torque converter unit then is distributed through turbine shaft 64 to the sun gear 180 as sun gear 174 acts as a reaction member. Carrier 202 thus is driven at a reduced speed relative to the speed of the turbine shaft 64, and its motion is transferred to the power output shaft 204.

To establish a high speed direct drive ratio, brake band 178 is released and the multiple disc clutch assembly is applied. This locks together the sun gears 174 and 180 thereby causing the elements of the gear system to rotate in unison as torque is delivered to the sun gears. Power output shaft 204 then is driven at the same speed as the turbine shaft 64.

Reverse drive ratio is obtained by releasing brake 178 and the multiple disc clutch assembly and applying reverse brake band 186. Turbine torque then is delivered to the sun gear 180 and ring gear 182 acts as a reaction member. This causes carrier 202 and power output shaft 204 to rotate in a direction opposite to the direction of rotation of the turbine shaft 64.

Passage 130 communicates with the passage 82. The latter passage in turn is in fluid communication with the cavity 100 by means of one or more fluid pressure distributor tubes 222. Thus when fluid pressure is admitted to passage 130, cavity 100 becomes pressurized. Piston 94 is provided with a flow restricting orifice 224 and the pressurized fluid in cavity 100 passes through it to the interior of the torus circuit. The pressure unbalance thus created by the orifice 224 creates a pressure force that tends to urge the piston 94 in a left-hand direction. This causes the blade elements 116 to assume a cruising position.

The fluid thus supplied to the torus circuit through the orifice 224 is circulated through the bladed passages of the converter unit and is returned through the space between stator shroud 66 and the turbine shroud 54. It is returned also through the space between shroud 54 and the shell part 36. The portion of the fluid that passes through the space between shroud 56 and shroud 54 is returned to the passage 138 through branch passage 142. The balance of the fluid passes directly into the passage 138 as it flows radially inwardly past thrust washer 226 located between shell part 36 and the turbine hub 60. The return fluid then passes through passage 136 and then to the passage 144.

The control valve system of FIGURE 4 is capable of reversing the direction of the fluid flow through the torque converter unit so that the passage 144 will function as a feed passage rather than as a flow return passage. Conversely, the passage 132 can be made to function as a return passage rather than as a feed passage. If this is done, the hydrokinetic fluid circulated through the converter unit will pass through orifice 224 in a right-hand direction as viewed in FIGURES 1 and 2. It then is returned through fluid distributor tube 222, through passage 82, through passage 130 and finally through passage 132. This creates a pressure unbalance across the orifice 224 which tends to urge the piston 94 in a right-hand direction as viewed in FIGURES 1 and 2. The adjustable blade elements 116 then will assume the high performance position. This position is indicated by means of the dotted lines in FIGURE 3.

In FIGURE 5 I have illustrated the performance characteristics of the torque converter unit for each of the two operating ranges. The curves for the torque ratio efficiency and size factor are shown in dotted lines in FIGURE 5 to illustrate the high torque ratio performance condition. The cruising condition is represented by full lines in FIGURE 5.

The terms "speed ratio," "torque ratio" and "size factor" have been defined by appropriate legends in FIGURE 5. The efficiency is simply the product of the torque ratio and the speed ratio.

Referring next to FIGURE 4, I have illustrated the valve system for controlling the direction of fluid flow through the hydrokinetic unit. This system includes a shift valve 228, a signal valve 230 and an inhibitor or limit valve 232.

A converter pressure regulator valve is indicated generally by reference character 234. It includes a valve spool 236 having spaced valve lands 238, 240 and 242 that are slidably received within a valve chamber 244 having cooperating internal valve lands. The valve spool normally is urged in a downward direction, as viewed in FIGURE 4, by a valve spring 246.

The low pressure intake side of the front pump shown in FIGURES 1 and 2 communicates with an annular groove 248 formed in the valve chamber 244. The high pressure side of the pump communicates with an annular groove 250. A lubricating oil passage 252 communicates with the chamber 244 at a location intermediate the valve lands 240 and 238.

An exhaust port 254 communicates with the lower portion of the valve chamber 244 at a location intermediate the valve lands 240 and 242. An exhaust passage 256 also communicates with this valve region at a location adjacent the lower edge of valve land 240.

A compensator pressure can be introduced into an annular groove 258 so that it may act upon the lower surface of the valve land 242.

Pressure from the fluid pressure supply pump tends to urge valve spool 236 in an upward direction by reason of the differential diameter of valve lands 240 and 238. This upward force, of course, is opposed by the spring 246. Land 238 controls the degree of communication between the pressure supply pump and the low pressure exhaust groove 248.

A converter feed passage 260 communicates with the groove 250. During initial operation of the vehicle engine, pressure in groove 250 begins to increase. This pressure is made available to the converter so that the converter may be filled immediately. Upon a continued increase in the pressure in groove 250, land 238 uncovers the lubricating oil passage 252. Thereafter the regulator valve spool 236 maintains a controlled pressure in passages 260 and 252, the magnitude of the pressure being determined by the calibration of the spring 246.

The operating pressure level maintained by the converter pressure regulator valve 234 can be controlled by the varying compensator pressure in groove 258. This pressure in turn can be made a function of vehicle speed and engine throttle setting. A decrease in vehicle speed for any given engine throttle setting will result in an increase in the regulated pressure. Furthermore, an increase in the engine throttle setting for any given vehicle speed will result in an increase in the regulated pressure.

The fluid that is supplied to lubricating passage 252 may be made to pass through an oil cooler 262 so that the operating temperature of the oil in the circuit can be stabilized. Upon passing through the various lubrication points in the transmission system, the fluid is returned to the sump where it finds its way to the low pressure intake side of the pressure supply pump.

The shift valve 228 includes three spaced valve lands 264, 266, and 268. Valve 228 is urged normally in a right-hand direction as viewed in FIGURE 4 by a valve spring 270. When the valve 228 assumes the position shown in FIGURE 4, converter flow passage 144 communicates with the shift valve chamber 272 at a location intermediate valve lands 266 and 268. An exhaust port 274 also communicates with the valve chamber 272 at this same region.

A converter flow passage 132 communicates with valve chamber 272 at a location intermediate valve lands 264 and 266. When the valve 228 assumes the position shown, fluid communication is established through the valve chamber 272 between passage 132 and passage 260. A branch passage 276 communicates with passage 260 but is blocked by land 266 when valve 228 assumes the position shown.

The signal valve 230 includes spaced valve lands 278, 280, 282, and 284. Valve 230 is slidably situated within a valve chamber 286 having internal valve lands that cooperate with the external valve lands of valve 230. Valve 230 is urged normally in a right-hand direction by valve springs 288.

A control pressure passage 290 establishes communication between passage 260 and the valve chamber 286 at a location intermediate lands 280 and 282 when the valve 230 assumes the position shown in FIGURE 4. Passage 290 communicates with a control pressure passage 292 through the valve chamber 286. When the valve 230 assumes the position shown, the pressure in passage 292 acts upon the right-hand side of valve land 264, thus tending to urge the shift valve 228 in a left-hand direction.

The right-hand end of valve land 278 of the valve 230 is subjected to a throttle pressure by means of a throttle pressure passage 294. This throttle pressure can be produced by means of a throttle pressure system of the type shown in U.S. Patent 3,095,755. Its magnitude is a measure of engine torque. Similarly, the compensator pressure referred to previously can be established by means of a compensator valve system of the type shown in U.S. Patent 3,095,755.

Valve lands 278 and 280 define a differential area that is subjected to governor pressure by means of a governor pressure passage 296. This governor pressure is a measure of the speed of the driven member of the transmission mechanism, as explained previously.

An exhaust port 298 communicates with the valve chamber 286 and is blocked by lands 282 when the valve 230 assumes the position shown in FIGURE 4.

The distribution of governor pressure to the signal valve 230 is controlled by the limit valve 232. This valve comprises a pair of spaced valve lands 298 and 300 which are slidably situated within a valve chamber 302 having cooperating internal valve lands. A valve spring 304 urges limit valve 232 in a left-hand direction.

The governor pressure in passage 296 acts upon valve land 298, thus tending to urge the valve 232 in a right-hand direction against the opposing influence of valve spring 304. The portion of the chamber 302 occupied by the spring 304 is exhausted through an exhaust port 306.

The pressure supplied to the multiple disc clutch assembly shown in FIGURES 1 and 2 is distributed to the valve chamber 302 through a pressure passage 308. It acts upon a reduced diameter portion 310 of the valve 232 and opposes the influence of the governor pressure in passage 296.

When the shift valve 228 assumes the position shown, control pressure is distributed from passage 260 through valve chamber 272 to the converter feed passage 132.

The fluid circulates through the torus circuit of the converter unit and returns through passage 144 as explained previously. It then is exhausted through the exhaust port 274, thus completing the flow path. It then is returned to the sump where it finds its way to the inlet side of the control pressure pump. As explained previously, this creates a pressure differential across the orifice 224 which causes the impeller blade exit elements to assume the cruise position.

Shift valve 228 assumes the position shown whenever passage 292 is pressurized. Distribution of pressure to this passage 292 is determined by the position of the signal valve 230. When this valve assumes the position shown, pressure is distributed directly across the valve chamber 286 from the passage 290.

If the vehicle operator desires to condition the transmission mechanism for high performance operation, he may increase the engine throttle setting to cause a corresponding increase in the pressure in passage 294. This urges the signal valve 230 in a left-hand direction against the opposing influence of spring 288. If the vehicle at this instant is at a standstill, the governor pressure of course is zero. Thus the pressure force established by the pressure in passage 294 is opposed only by the force of spring 288. In a preferred embodiment of my invention, valve 230 may be caused to shift when the engine carburetor throttle setting reaches approximately the 40% value. As the valve 230 shifts in a left-hand direction, land 280 blocks passage 290 and communication is established between exhaust port 298 and passage 292. This then causes the shift valve to assume a right-hand position. Passage 132 then is brought into communication with passage 256 which communicates with exhaust port 254 in the converter pressure regulator valve 234.

Land 240 restricts passage 256 under these conditions so that the transition from the cruising range to the driving range will not occur abruptly. Valve 228 furthermore establishes communication between branch passage 276 and passage 144 as it is shifted in a right-hand direction. At the same time exhaust port 274 is blocked by land 268. Thus passage 144 now becomes a converter feed passage and the passage 132 becomes the converter flow return passage. As explained previously, this causes an adjustment of the impeller exit blade elements to the performance position.

When governor pressure is developed in passage 296, the limit valve 232 will be shifted in a right-hand direction against the opposing influence of spring 304. Communication then is established between passage 296 and a branch passage 312, which extends to the left-hand side of the valve chamber 286. This augments the influence of the springs 288. Communication between passage 312 and exhaust port 314 is interrupted under these conditions.

The point at which the limit valve will shift depends, of course, upon whether passage 308 is pressurized. It is pressurized, as is apparent from the foregoing description of FIGURE 1, only during operation in the high speed range. Under wide open throttle conditions, the limit valve 232 may be caused to shift in a right-hand direction at approximately 30 miles per hour when the gear system is conditioned for low speed ratio operation. As soon as this occurs, governor pressure is made available to the left-hand portion of the signal valve chamber 286 thus shifting the signal valve 230 in a right-hand direction. This, of course, causes the shift valve immediately to assume a left-hand position which, as explained previously, conditions the transmission mechanism for optimum cruising operation. It thus is not possible to obtain a transition from the cruising range to the performance range when the vehicle travels at a speed greater than 30 miles per hour in the low speed ratio.

If the gear system is conditioned for high speed ratio operation, the shift of the limit valve is delayed by reason of the fact that passage 308 is pressurized. Thus during wide open throttle operation, it is impossible to obtain a transition from the cruising range to the performance range at speeds greater than 70 miles per hour while the gear system is operating in the high speed range.

The signal valve and the limit valve can be calibrated as desired by appropriately calibrating the springs and the areas of the valve lands. In one embodiment of my invention, the system is calibrated so that the shift valve will move in a left-hand direction when the engine throttle approaches the 40% setting and the vehicle speed is approximately 40 miles per hour.

If the control system utilizes a vacuum type throttle valve as shown in Patent No. 3,095,755, it is possible that the throttle pressure signal will be inadequate at higher vehicle speeds when the engine throttle is advanced. This is due to the low in engine vacuum that is experienced under these conditions. For this reason governor pressure is applied to the right-hand side of the signal valve to assist the throttle pressure and thereby causing the signal to respond more dependably to driver demand for engine torque.

Having thus described a preferred embodiment of my invention, what I claim and desire to secure by U.S. Letters Patent is:

1. A hydrokinetic torque converter mechanism comprising a bladed impeller and a bladed turbine situated in juxtaposed fluid flow relationship in a common torus circuit, said impeller being connected to a driving member, said turbine being connected to a driven member, said impeller comprising a first bladed section and auxiliary fluid directing blade elements located at the flow exit region of said first bladed section, a fluid pressure operated servo including two relatively movable parts, one part being connected to said impeller for rotation therewith, the other part being movable relative to said first part, a connection between said other part and said blade elements whereby the angularity of the latter may be controlled in response to relative movement of said parts, a flow restricting orifice formed in said other part, a hydrodynamic fluid flow passage means for supplying fluid to said converter mechanism, said passage means being defined in part by said orifice, and valve means for controlling the fluid flow through said passage means whereby said servo parts can be adjusted in response to a pressure differential across said orifice created by the fluid flow, said valve means including a movable valve element situated in and partly defining said fluid flow passage means, the latter having branch portions communicating respectively with the flow exit side and the flow entrance side of said trous circuit, a source of a pressure signal, and branch passage means connecting said pressure signal source to said movable valve element whereby the latter is adjusted from one operating position to the other thereby selectively controlling the direction of flow through said torus circuit to initiate a pressure response of said fluid pressure operated servo.

2. A hydrokinetic power transmission mechanism for delivering torque from a driving member to a driven member and comprising an impeller connected to said driving member, a turbine drivably connected to said driven member, said impeller and said turbine being disposed in toroidal fluid flow relationship in a common torus circuit, said impeller comprising an inner shroud and an outer shroud, flow directing blade elements disposed between said impeller shrouds and cooperating therewith to define radial outflow passages, adjustable blade exit elements carried by said impeller at the flow exit region of said first named blade elements, an annular cylinder carried by said inner shroud, an annular piston disposed in said cylinder and cooperating therewith to define a pressure cavity, a connection between said piston and said adjustable blade elements whereby the angularity of the latter can be controlled as said piston moves relative to said cylinder, a flow restricting orifice formed in said piston, fluid flow passage means for circulating fluid through said circuit, said passage means being defined in part by said flow restricting orifice, a source of pressurized fluid, said passage means communicating with said source comprising a first portion and a second portion communicating with separate regions of said circuit, the fluid circulating through said circuit being fed through one portion and returned through the other portion, and shift valve means for connecting selectively said source with each of said portions to control the direction of fluid flow through said passage means.

3. A hydrokinetic power transmission mechanism adapted to deliver driving torque from a driving member to a driven member, a bladed impeller and a bladed turbine situated in toroidal fluid flow relationship in a common torus circuit, said impeller being connected to said driving member, said turbine being connected to said driven member, said impeller having fluid directing blades situated at the flow exit region thereof, fluid pressure operated servo means located within the inner torus region of said circuit for adjustably positioning said blades and comprising a movable piston connected mechanically to said blades for adjustably positioning the latter, a flow restricting orifice formed in said piston, fluid passage means for circulating fluid through said circuit with one portion thereof being adapted to direct fluid to one region of said circuit and the other portion thereof being adapted to accommodate the return flow of fluid from another region of said circuit, a source of pressurized fluid, shift valve means for connecting selectively said source with each of said portions of said passage means, an auxiliary passage communicting with said source and with said shift valve means for distributing pressure to the latter for actuating the same, phase valve means located in and partly defining said auxiliary passage means for selectively interrupting and establishing communication between said shift valve means and said source in response to changes in operating variables of said mechanism.

4. A hydrokinetic power transmission mechanism adapted to deliver driving torque from a driving member to a driven member, a bladed impeller and a bladed turbine situated in toroidal fluid flow relationship in a common torus circuit, said impeller being connected to said driving member, said turbine being connected to said driven member, said impeller having fluid directing blades situated at the flow exit region thereof, fluid pressure operated servo means located within the inner torus region of said circuit for adjustably positioning said blades and comprising a movable piston connected mechanically to said blades for adjustably positioning the latter, a flow restricting orifice formed in said piston, fluid passage means for circulating fluid through said circuit with one portion thereof being adapted to direct fluid to one region of said circuit and the other portion thereof being adapted to accommodate the return flow of fluid from another region of said circuit, a source of pressurized fluid, shift valve means for connecting selectively said source with each of said portions of said passage means, an auxiliary passage communicating with said source and with said shift valve means for distributing pressure to the latter for actuating the same, phase valve means located in and partly defining said auxiliary passage means for selectively interrupting and establishing communication between said shift valve means and said source, a source of a pressure signal that is proportional in magnitude to the torque applied to said driving member, a source of a pressure signal that is proportional in magnitude to the speed of said driven member, and passage means for distributing said signals from their respective sources to said phase valve means for establishing opposed fluid pressure forces thereon, said phase valve means responding to changes in the relative magnitudes of said pressure forces.

5. A hydrokinetic power transmission mechanism adapted to deliver driving torque from a driving member to a driven member, a bladed impeller and a bladed turbine situated in toroidal fluid flow relationship in a common torus circuit, said impeller being connected to said driving member, said turbine being connected to said driven member, said impeller having fluid directing blades situated at the flow exit region thereof, fluid pressure operated servo means located within the inner torus region of said circuit for adjustably positioning said blades and comprising a movable piston connected mechanically to said blades for adjustably positioning the latter, a flow restricting orifice formed in said piston, fluid passage means for circulating fluid through said circuit with one portion thereof being adapted to direct fluid to one region of said circuit and the other portion thereof being adapted to accommodate the return flow of fluid from another region of said circuit, a source of pressurized fluid, shift valve means for connecting selectively said source with each of said portions of said passage means, an auxiliary passage communicating with said source and with said shift valve means for distributing pressure to the latter for actuating the same, phase valve means located in and partly defining said auxiliary passage means for selectively interrupting and establishing communication between said shift valve means and said source, in a source of a pressure signal that is proportioned to the speed of said driven member, a speed signal passage means for distributing said signal to said phase valve means for establishing a fluid pressure force thereon to actuate the same, and limit valve means disposed in and partly defining said signal passage means for interrupting distribution of said speed signal to said phase valve means at speeds greater than a predetermined value.

6. A hydrokinetic power transmission mechanism adapted to deliver driving torque from a driving member to a driven member, a bladed impeller and a bladed turbine situated in toroidal fluid flow relationship in a common torus circuit, said impeller being connected to said driving member, said turbine being connected to said driven member, said impeller having fluid directing blades situated at the flow exit region thereof, fluid pressure operated servo means located within the inner torus region of said circuit for adjustably positioning said blades and comprising a movable piston connected mechanically to said blades for adjustably positioning the latter, a flow restricting orifice formed in said piston, fluid passage means for circulating fluid through said circuit with one portion thereof being adapted to direct fluid to one region of said circuit and the other portion thereof being adapted to accommodate the return flow of fluid from another region of said circuit, a source of pressurized fluid, shift valve means for connecting selectively said source with each of said portions of said passage means, an auxiliary passage communicating with said source and with said shift valve means for distributing pressure to the latter for actuating the same, phase valve means located in and partly defining said auxiliary passage means for selectively interrupting and establishing communication between said shift valve means and said source, a source of a pressure signal that is proportional in magnitude to the torque applied to said driving member, a source of a pressure signal that is proportional in magnitude to the speed of said driven member, and passage means for distributing said signals from their respective sources to said phase valve means for establishing opposed fluid pressure forces thereon, said phase valve means responding to the change in the relative magnitudes of said pressure signals, and limit valve means disposed in and partly defining the passage means for said speed signal for interrupting distribution of said speed signal to said phase valve means at speeds greater than a predetermined value.

7. A hydrokinetic power transmission mechanism adapted to deliver driving torque from a driving member to a driven member, a bladed impeller and a bladed turbine situated in toroidal fluid flow relationship in a common torus circuit, said impeller being connected to said driving member, said turbine being connected to said driven member, said impeller having fluid directing blades situated at the flow exit region thereof, fluid pressure operated servo means located within the inner torus region of said circuit for adjustably positioning said blades and comprising a movable piston connected mechanically to said blades for adjustably positioning the latter, a flow restricting orifice formed in said piston, fluid passage means for circulating fluid through said circuit with one portion thereof being adapted to direct fluid to one region of said circuit and the other portion thereof being adapted to accommodate the return flow of fluid from another region of said circuit, a source of pressurized fluid, shift valve means for connecting selectively said source with each of said portions of said passage means, an auxiliary passage communicating with said source and with said shift valve means for distributing pressure to the latter for actuating the same, phase valve means located in and partly defining said auxiliary passage means for selectively interrupting and establishing communication between said shift valve means and said source, a source of a pressure signal that is proportioned to the speed of said driven member, a speed signal passage means for distributing said signal to said phase valve means for establishing a fluid pressure force thereon to actuate the same, limit valve means disposed in and partly defining said signal passage means for interrupting distribution of said speed signal to said phase valve means at speeds greater than a predetermined value, a multiple speed ratio gear system having an input element thereof connected to said driven member, a power output shaft connected to a power output element of said gear system, clutch and brake means for controlling the relative motion of the elements of said gear system to condition the same for operation in either a low speed ratio or a higher speed ratio, fluid pressure operated servos for actuating said clutch and brake means, and a fluid connection between said limit valve means and one of said servos for modifying the response of said limit valve means to said speed signal.

8. A hydrokinetic power transmission mechanism adapted to deliver driving torque from a driving member to a driven member, a bladed impeller and a bladed turbine situated in toroidal fluid flow relationship in a common torus circuit, said impeller being connected to said driving member, said turbine being connected to said driven member, said impeller having fluid directing blades situated at the flow exit region thereof, fluid pressure operated servo means located within the inner torus region of said circuit for adjustably positioning said blades and comprising a movable piston connected mechanically to said blades for adjustably positioning the latter, a flow restricting orifice formed in said piston, fluid passage means for circulating fluid through said circuit with one portion thereof being adapted to direct fluid to one region of said circuit and the other portion thereof being adapted to accommodate the return flow of fluid from another region of said circuit, a source of pressurized fluid, shift valve means for connecting selectively said source with each of said portions of said passage means, an auxiliary passage communicating with said source and with said shift valve means for distributing pressure to the latter for actuating the same, phase valve means located in and partly defining said auxiliary passage means for selectively interrupting and establishing communication between said shift valve means and said source, a source of a pressure signal that is proportional in magnitude to the torque applied to said driving member, a source of a pressure signal that is proportional in magnitude to the speed of said driven member, passage means for distributing said signals from their respective sources to said phase valve means for establishing opposed fluid pressure forces thereon, said phase valve means responding to changes in the relative magnitudes of said pressure signals, limit valve means disposed in and partly defining the pressure means for said speed signal for interrupting distribution of said speed signal to said phase valve means at speeds greater than a predetermined value, a multiple speed ratio gear system having an input element thereof connected to said driven member, a power output shaft connected to a power output element of said gear system, clutch and brake means for controlling the relative motion of the elements of said gear system to condition the same for operation in either a low speed ratio or a higher speed ratio, fluid pressure operated servos for actuating said clutch and brake means, and a fluid connection between said limit valve means and one of said servos for modifying the response of said limit valve means to said speed signal.

References Cited by the Examiner
UNITED STATES PATENTS

| | | | |
|---|---|---|---|
| 2,911,786 | 11/1959 | Kelly | 60—12 |
| 3,021,676 | 2/1962 | Tuck | 60—54 |
| 3,096,613 | 7/1963 | Winchell | 60—12 |

DAVID J. WILLIAMOWSKY, *Primary Examiner.*

J. R. BENEFIEL, *Assistant Examiner.*